(12) United States Patent
Seitz et al.

(10) Patent No.: US 6,927,793 B1
(45) Date of Patent: Aug. 9, 2005

(54) METHOD AND DEVICE FOR FORMING AN IMAGE

(75) Inventors: Peter Seitz, Urdorf (CH); Graham K. Lang, Hausen AM Albis (CH); Nicolas Blanc, Oberrieden (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 09/439,915

(22) Filed: Nov. 12, 1999

(30) Foreign Application Priority Data

Nov. 18, 1998 (EP) .................................. 98121897

(51) Int. Cl.$^7$ ........................................... H04N 5/235
(52) U.S. Cl. .................................... 348/230.1; 348/297
(58) Field of Search .................... 348/229.1, 230.1, 348/222.1, 297

(56) References Cited

U.S. PATENT DOCUMENTS

| | | | | |
|---|---|---|---|---|
| 4,647,975 A | * | 3/1987 | Alston et al. ............ | 348/222.1 |
| 4,734,776 A | | 3/1988 | Wang et al. | |
| 5,144,442 A | * | 9/1992 | Ginosar et al. .......... | 348/222.1 |
| 5,309,243 A | | 5/1994 | Tsai | |
| 5,572,256 A | * | 11/1996 | Egawa et al. ............... | 348/296 |
| 5,671,013 A | | 9/1997 | Nakao | |
| 6,011,251 A | * | 1/2000 | Dierickx et al. ............ | 348/297 |
| 6,115,065 A | * | 9/2000 | Yadid-Pecht et al. ....... | 348/308 |
| 6,175,383 B1 | * | 1/2001 | Yadid-Pecht et al. ....... | 348/297 |
| 6,204,881 B1 | * | 3/2001 | Ikeda et al. ................. | 348/362 |
| 6,429,898 B1 | * | 8/2002 | Shoda et al. ................ | 348/316 |
| 6,441,851 B1 | * | 8/2002 | Yonemoto ................... | 348/297 |
| 6,493,025 B1 | * | 12/2002 | Kiriyama et al. ....... | 348/231.99 |
| 6,677,992 B1 | * | 1/2004 | Matsumoto et al. ..... | 348/229.1 |

FOREIGN PATENT DOCUMENTS

EP 0 387 817 A2 9/1990

OTHER PUBLICATIONS

Aizawa K et al: "Computational Image Sensor for on Sensor Compression" IEEE Transactions on Electron Devices, vol. 44, No. 10, Oct. 1997, pp. 1724-1730, XP000703886.

* cited by examiner

*Primary Examiner*—Wendy R. Garber
*Assistant Examiner*—Jacqueline Wilson
(74) *Attorney, Agent, or Firm*—Oppedahl & Larson LLP

(57) ABSTRACT

The method for forming an image with a wide dynamic range makes use of an image sensor containing subsets of pixels that can be individually reset. After an initial reset (21), a pixel or row of pixels is exposed (22) for a first time interval and the gray value(s) ($P_{long}^{(255)}$) are read out (23) and stored (24). The pixel or row of pixels is then reset (25) and exposed (26) for a second, shorter time interval. The second gray value(s) ($P_{short}^{(255)}$) is/are read out (27) and either stored or immediately combined (28) with the first gray value(s) ($P_{long}^{(255)}$) by means of a merging function ($f$). The merging function ($f$) ensures a monotonic, smooth change in output from the lowest to the highest gray values. The procedure is repeated for all pixels or rows of pixels in the image sensor, thus obviating the need for the storage of complete images. The method reduces temporal aliasing to a minimum and eliminates spatial aliasing.

13 Claims, 3 Drawing Sheets

METHOD AND DEVICE FOR FORMING AN IMAGE

The invention relates to a method for forming an image and to an image sensor with an active area containing a plurality of pixels. It makes possible a wide dynamic range but obviates the need for a storage of complete images. It reduces temporal aliasing to a minimum and eliminates spatial aliasing.

BACKGROUND

Image sensing devices can be realized with semiconductors based on their capability to convert locally impinging light energy into a proportional amount of electronic charge. More specifically, if a picture element is exposed during time T to the local light power $P_L$, a charge signal Q is created according to the equation $$Q=P_L \gamma T \quad (1)$$

where $\gamma$ denotes the conversion efficiency of photons into electronic charge, which strongly depends on the wavelength spectrum of the incoming light. This charge Q, often called photocharge, can be stored in a two-dimensional array of charge storage devices such as a reverse biased diode (as in photodiode-based image sensors) or such as a pre-charged metal-oxide-semiconductor capacitance (as in charge-coupled devices, CCDs).

Due to the limited storage capacity of these storage devices, the ratio of maximum storable photocharge to photocharge detection noise, called dynamic range, is also limited. In typical CCD or photodiode image sensors, the available dynamic range is of the order of 1'000:1. Unfortunately, natural scenes (where there is no control of lighting conditions) and indoor scenes with highly varying illumination have a dynamic range of between 100'000:1 and 1'000'000:1.

The dynamic range of an image sensor can be increased by making use of the exposure time dependence shown in Equation (1). The patents U.S. Pat. No. 5,144,442, U.S. Pat. No. 5,168,532, U.S. Pat. No. 5,309,243 and U.S. Pat. No. 5,517,242 describe methods based on the acquisition of two or more images, each with its individual exposure time. At least one complete image has to be stored with these methods, preferentially in digital form by making use of a frame-store. This results in a complex and cost-intensive system. Moreover, the two or more images with different exposure times cannot be taken concurrently, therefore not representing the same moving scenes at different exposure levels but rather at different points in time. Consequently, such methods exhibit undesirable temporal aliasing.

This problem can be overcome by a method described in U.S. Pat. No. 5,483,365 and U.S. Pat. No. 5,789,737. The approach taken in U.S. Pat. No. 5,483,365 consists of using alternate image sensor rows for different exposure times. U.S. Pat. No. 5,789,737 teaches the use of several picture elements (pixels), each with its own sensitivity. In both cases, the brightness information may be acquired concurrently in time but not at the identical geometrical pixel location. This implies spatial undersampling and aliasing, which is particularly undesirable in the case of so-called highlights, i.e., localized very bright pixel values usually caused by specular reflections at objects in the scene.

Once a plurality of images have been taken at different exposure times, they have to be fused or merged to form one single piece of pixel information of wide dynamic range. Patents U.S. Pat. No. 4,647,975, U.S. Pat. No. 5,168,532 and U.S. Pat. No. 5,671,013 teach that the information is copied from the most suitable of the images, according to some selection rule. This value is then multiplied with a suitable factor that corrects for the respective exposure time. This method works well only for ideal image sensors with completely linear pixel behavior, irrespective of illumination level and exposure time. In practical image sensors, this is not true, and the resulting response curve (output value vs. illumination levels) shows discontinuities. This is particularly disturbing if the resulting images are processed further, leading to false contours and erroneous contrast values. An improvement is taught by U.S. Pat. No. 5,517,242 claiming an algorithm where the output value at each pixel site is calculated in a certain brightness range as a linear combination of the values at two different exposure times, corrected by an appropriate factor that compensates for the different exposure times. In all these methods, either complete images have to be stored, or complex and surface-intensive electronic circuitry in each pixel is required.

It is the aim of the invention to overcome the aforementioned disadvantages of the prior-art methods and image sensors. In particular, the invention shall make possible a wide dynamic range but obviate the need for a storage of complete images. It shall, moreover, reduce temporal and spatial aliasing to a minimum. The problem is solved by the invention as defined in the independent claims.

SUMMARY OF THE INVENTION

The invention is based on the local acquisition of pixel information for different exposure times, following Equation (1). The problems of the requirement for complete image storage and of temporal or spatial sampling at different points in time or in space are overcome by using a type of image sensors in which a subset of pixels (e.g., a single pixel or a row of pixels) can be individually reset and read out. A preferred embodiment is an active pixel sensor (APS) pixel that can be fabricated in standard CMOS technology. Such an APS is described for example in E.R. Fossum, "Active Pixel Sensors: Are CCD's Dinosaurs?", *Proc. SPIE* 1900 (1993) 2–14.

The method according to the invention for forming an image uses an image sensor with an active area containing a plurality of pixels. The method comprises a) in n interrogation runs performed on a first subset of pixels, where n is an integer and n≧2, resetting the first subset of pixels, exposing the first subset of pixels and reading out the output value(s) of the first subset of pixels;

b) combining said output values into a first combined output value;

c) repeating steps a) and b) for at least one second subset of pixels.

In order to obtain a complete image information, steps a) and b) are preferably repeated until each pixel has been read out at least once.

The subset is understood to contain less pixels than the whole image sensor. The subset may be, e.g., a row, a column or a single pixel of the image sensor. All subsets preferably have the same number of pixels. The subsets are preferably defined before performing step a) of the method by partitioning the active area of the image sensor. The processing of one subset of pixels may temporally overlap with the processing of the following subset of pixels.

In a preferred embodiment of the invention, n=2 for all subsets of pixels, i.e., each subset is exposed twice, with a longer and a shorter exposure time. A first reset command is issued to one pixel or all pixels in one row. After a first, long exposure time $T_{long}$, the output value(s) $P_{long}$ of the pixel or all pixels in this row is/are read out and immediately stored in analog or digital form. Immediately afterwards, the pixel or row of pixels is reset and exposed during a second, short exposure time $T_{short}$. The output value(s) $P_{short}$ of the pixel or row of pixels is/are read out. This information is either again stored in analog or digital fashion, or it can immediately be processed together with the previously stored pixel or row-of-pixel output values, according to the procedure given below. Depending on the desired value of $T_{long}$, the pixel or row of pixels can immediately be reset for a maximum value of exposure time, or it/they can be reset at a later time. After this pixel or row of pixels has been reset and read twice, the next pixel or row of pixels is interrogated in the same fashion.

In the method according to the invention, the timing used to reset and interrogate the sequence of pixels in an image sensor is important. The ratio $t=T_{long}/T_{short}$ is chosen to increase significantly the dynamic range of the image sensor, insuring, however, an overlap between the images. For example, the dynamic range of an image sensor can be increased by the method according to the invention from 70 dB to 110 dB using a ratio of t=100. During the long integration time, many pixels or rows of pixels can be interrogated and reset a first time, exposed during a second (much shorter) time interval, interrogated and reset a second time. Preferably, these operations are performed on all other pixels or rows of pixels during the long integration time of one pixel or row of pixels, so that the ratio $t=T_{long}/T_{short}$ is equal to the total number of pixels or rows of pixels of the image sensor. Compared with the state of the art, this has three advantages. Firstly, at most two rows of pixel data have to be stored at one time, and it is completely unnecessary to acquire and store complete images before processing and merging the data. Secondly, the short exposure time occurs immediately after the long one, effectively assuring a quasi-instantaneous exposure. Thirdly, the same pixel location is employed to acquire image data for the different exposure times and no spatial aliasing can occur.

During the first, long exposure, dark objects are detected, whereas very bright objects are not, due to saturation of the corresponding pixels; during the second, short exposure, bright objects are detected, whereas very dark objects are not, due to a too weak signal. According to the invention, the output signals of both exposures are suitably combined in order to increase the dynamic range of the image sensor. Due to imperfections in the practical realizations of the above-described method and device, the two pixel output values $P_{short}$ and $P_{long}$ measured for the two exposure times will not be related ideally through the ratio $t=T_{long}/T_{short}$, i.e., $P_{long}$ will be close to but not identical with $t \cdot P_{short}$. For this reason we need an algorithm that combines the two values in a manner that does not lead to artifacts in subsequent image processing and interpretation procedures. For this, it is important to find a method that ensures a monotonic, smooth transition from values taken with long to values taken with short exposure times.

The invention encompasses the following method to arrive at this goal. For each pixel or row of pixels, the two pixel output values $P_{long}$ and $P_{short}$ are processed into a single value $P_{out}$, using a merging function $f(x_1, x_2)$:

$$P_{out} = f(P_{long}, t \cdot P_{short}).$$

The merging function $f(x_1,x_2)$ is preferably truly monotonic, continuous and continuously differentiable in both independent variables $x_1$ and $x_2$. It should have the following properties:

| | | |
|---|---|---|
| (i) | $f(x_1, x_2) = x_1$ | for $x_1 \leq x_{low}$ |
| (ii) | $f(x_1, x_2) = x_2$ | for $x_1 \geq x_{up}$, |
| | | where $0 \leq x_{low} < x_{up}$ |
| (iii) | $f(x_1, x_2)$ increases truly monotonically in $x_1$ and $x_2$ | for $x_{low} < x_1 < x_{up}$ |

In other words, the merging function $f(x_1,x_2)$ preferably obeys the following rules:
(i) Preference is given to the output value $x_1$ obtained from the longer exposure when the output values $x_1$, $x_2$ or an appropriate combination of the output values $x_1$, $x_2$, e.g., their average $(x_1+x_2)/2$, lie beneath a given lower limit $x_{low}$;
(ii) Preference is given to the output value $x_2$ obtained from the shorter exposure when the output values $x_1$, $x_2$ or an appropriate combination of the output values $x_1$, $x_2$, e.g., their average $(x_1+x_2)/2$, lie above a given upper limit $x_{up}$;
(iii) The merging function $f(x_1,x_2)$ increases truly monotonically in the output values $x_1$, $x_2$ when the output values $x_1$, $x_2$ lie between the lower limit $x_{low}$ and the upper limit $x_{up}$.

The parameters $x_{up}$, $x_{low}$ are chosen according to the following criteria.

The lower limit $x_{low}$ is given by the minimum illumination required for the short exposure time. For lower illumination, the sensor output corresponds essentially to noise and cannot be interpreted.

The upper limit $x_{up}$ corresponds to the output value computed for maximum allowable light intensity for the long exposure time. At higher illumination, the sensor shows first a non-linear response and will eventually saturate.

The parameters $x_{up}$, $x_{low}$ have either preset values, or can vary with time, e.g., be determined from earlier output signals and thus adapt to the actual illumination of the image sensor.

A preferred example of a merging function $f(x_1,x_2)$ for the range for $x_{low} < x_1 < x_{up}$ is the following:

$$f(x_1, x_2) = \sqrt{cx_1^2 + (1-c)x_2^2} \text{ with } c = (x_1 - x_{up})/(x_{low} - x_{up}).$$

This merging function notably exhibits the following desirable properties. It gives increased preference to the value $x_1$ when $x_1$ is close to $x_{low}$, and it gives increased preference to the value $x_2$ when $x_1$ is close to $x_{up}$. It is truly monotonic, continuous and continuously differentiable in $x_1$ and $x_2$, inhibiting banding and discontinuous jumps in subsequent algorithms that calculate and employ the first spatial derivative of the local brightness values. Moreover, it is symmetric in $x_1$ and $x_2$.

The above considerations for an example with two interrogation runs, i.e., n=2, may be generalized for the case where n≧2. Then a merging function $f(x_1, \ldots, x_n)$ is used for combining n output values $P_1, \ldots, P_n$ into a single value $P_{out}$ according to the formula $$P_{out} = f(P_1, t_2 \cdot P_2, \ldots, t_n \cdot P_n),$$

where $t_2, \ldots, t_n$ are appropriate scaling factors.

The merging function can be evaluated either in a general-purpose digital computation unit, a dedicated digital or analog computation unit that is preferentially placed on the same chip as the sensor, or the merging function can be realized with a lookup-table, either partially or completely.

The image sensor according to the invention comprises an active area containing a plurality of pixels, whereby at least two subsets of pixels may be individually interrogated, i.e., they can individually be reset and read out. The image sensor further comprises means for individually interrogating subsets of pixels, means for combining output values of said subsets into combined output values, and means for electrically outputting said combined output values.

BRIEF DESCRIPTION OF THE DRAWINGS

In the following, the invention and a preferred embodiment thereof are described in more detail with reference to the drawings, wherein.

DETAILED DESCRIPTION

Figure 1:
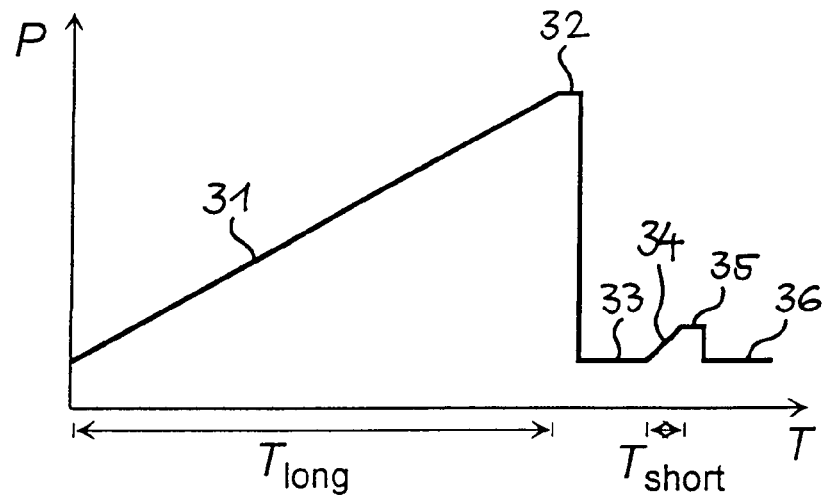
FIG. 1 shows the output of one pixel in the method according to the invention.

FIG. 1 schematically shows the output P of one given pixel as a function of time T in the method according to the invention. The figure illustrates an example in which two exposures, a first exposure 31 with a long exposure time $T_{long}$ and a second exposure 34 with a short exposure time $T_{short}$, are performed on each subset of pixels. After the first exposure 31, the pixel output value is read out 32 and reset 33 for a first time. A second read-out 35 and, optionally, a second reset 36 are performed after the second exposure 34. Then, the pixel is ready for a further interrogation cycle. Of course, other variants of the method are possible in which, e.g., the first exposure time is shorter and the second one is longer, or in which more than two exposures are performed in one interrogation cycle.

Figure 2:
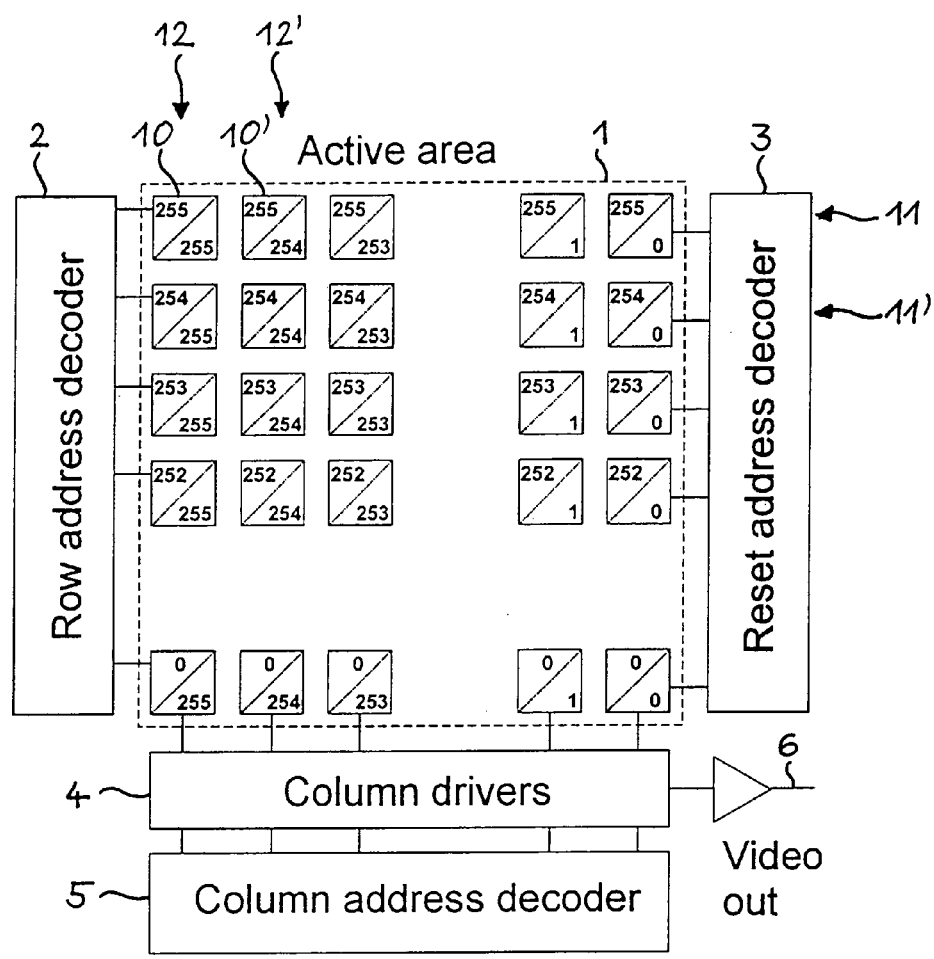
FIG. 2 shows the architecture of an image sensor suited for the method according to the invention.

FIG. 2 shows a schematic of the architecture of an image sensor suited for carrying out the method according to the invention. In this exemplified embodiment, the image sensor has an active area 1 consisting of a matrix of 256×256 pixels 10, 10', . . . arranged in rows 11, 11', . . . and columns 12, 12', . . . A row address decoder 2 and a reset address decoder 3 are provided for the rows 11, 11', . . . The reset address decoder has the function of an electronic row shutter. A column driver 4 and a column address decoder 5 are provided for the columns 12, 12', . . . The image signals are outputted via a video output 6.

Figure 3:
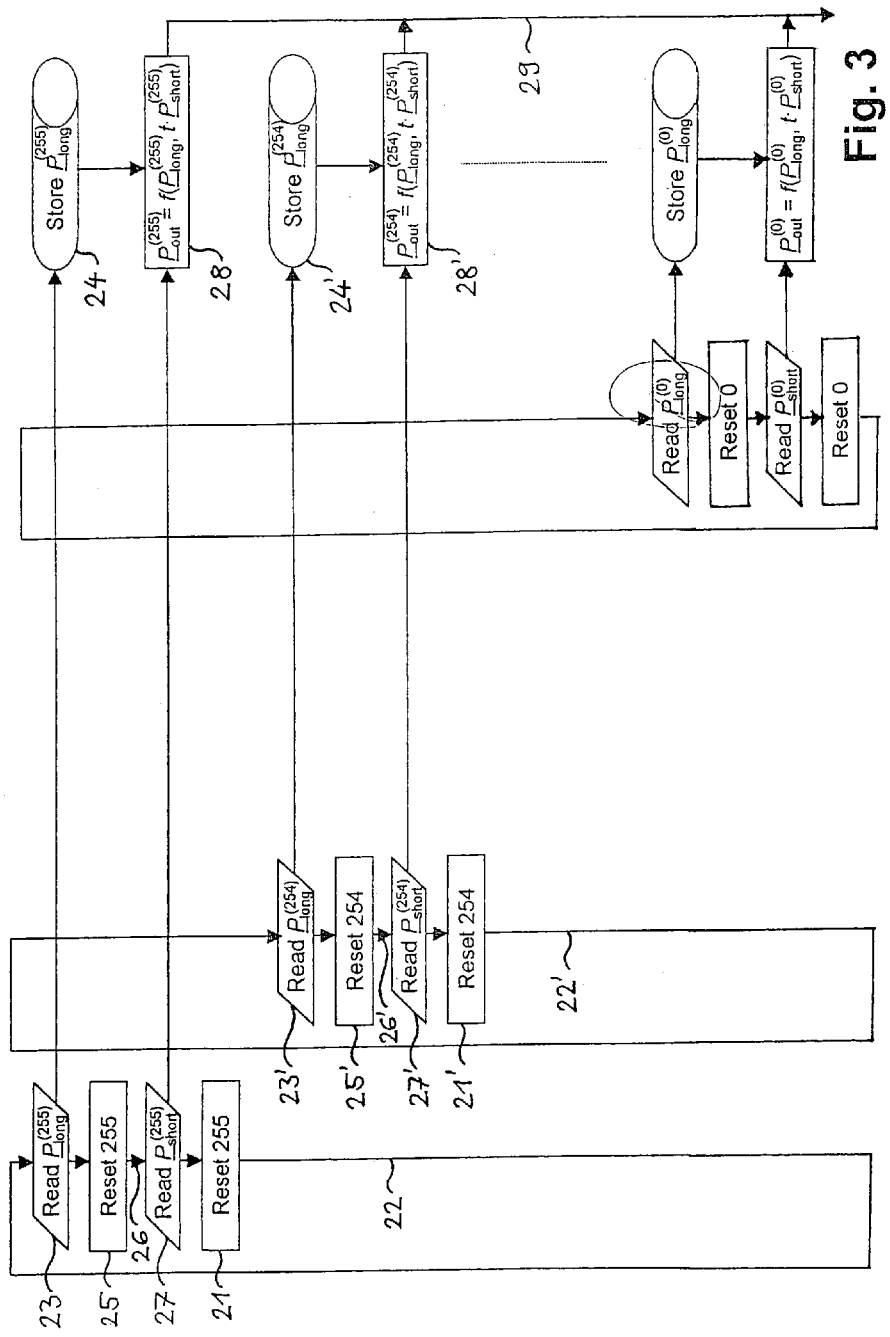
FIG. 3 shows a flow chart of the method according to the invention.

Referring to the image sensor of FIG. 2, FIG. 3 shows a flow chart of a preferred embodiment of the method according to the state of the art. A read-out sequence for one full frame with two exposures (cf FIG. 1) is shown. In this embodiment, the subsets of pixels are the 256 rows 11, 11', . . . of the image sensor, each subset thus consisting of 256 pixels 10, 10', . . . The first subset to be interrogated is, e.g., row No. 255. A first reset command 21 is issued to all pixels in row No. 255. After a first, long exposure time 22, the output values $P_{long}^{(255,255)}$ to $P_{long}^{(255,0)}$ of all 256 pixels in this row No. 255 are read out 23 and immediately stored 24 in analog or digital form. Immediately afterwards, row No. 255 is reset 25 and exposed during a second, short exposure time 26. The output values $P_{short}^{(255,255)}$ to $P_{short}^{(255,0)}$ of all 256 pixels are read out 27. This information is either again stored in analog or digital fashion, or it can immediately be processed 28 together with the previously stored output values $P_{long}^{(255,255)}$ to $P_{long}^{(255,0)}$. After row No. 255 has been reset and read twice, the next row No. 254 is interrogated in the same fashion; the corresponding elements in FIG. 3 are designated with the same reference numbers as for row No. 255 and additional apostrophes, e.g., reference number 21' stands for a first reset command to all pixels in row. No. 254. These steps are performed for each row, ending with row No. 0. Then each pixel has been read out once, in two interrogation runs, and a first complete image can be built up 29 from the processed output values $\underline{P}_{out}^{(255)}$ to $\underline{P}_{out}^{(0)}$. This procedure can be repeated as many times as desired.

Figure 4:
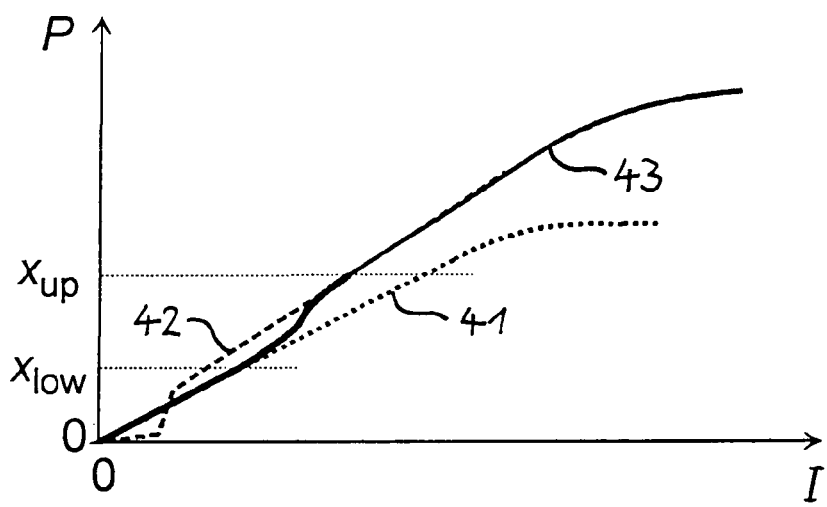
FIG. 4 shows an output characteristic of a multiple-exposure image sensor according to the invention.

FIG. 4 schematically shows an output characteristic of a multiple-exposure image sensor according to the invention, i.e., output values P as functions of the light intensity I. Again, an exemplified embodiment with two exposures is discussed. A first graph 41 in FIG. 4 represents the output $P_{long}$ for the long exposure. For low intensities, $P_{long}$ increases linearly with the intensity I; above an upper limit $x_{up}$, it flattens due to saturation. A second graph 42 in FIG. 4 represents output $P_{short}$ for the short exposure, multiplied with a scaling factor t, i.e., $t \cdot P_{short}$. Beneath a lower limit $x_{low}$, the signal is too weak and therefore useless; for higher intensities, $t \cdot P_{short}$ increases linearly with the intensity I. A third graph 43 in FIG. 4 shows an example for a combined output $$P_{out} = f(P_{long}, t \cdot P_{short}).$$

The merging function $f(x_1, x_2)$ has the following properties:

| (i)   | $f(x_1, x_2) = x_1$ | for $x_1 \leq x_{low}$ |
|-------|---------------------|------------------------|
| (ii)  | $f(x_1, x_2) = x_2$ | for $x_1 \geq x_{up}$, |
|       |                     | where $0 \leq x_{low} < x_{up}$, |
| (iii) | $f(x_1, x_2)$ increases truly monotonically in $x_1$ and $x_2$ | for $x_{low} < x_1 < x_{up}$ |

This merging function gives increased preference to the value $x_1$ when $x_1$ is close to $x_{low}$, and it gives increased preference to the value $x_2$ when $x_1$ is close to $x_{up}$. Thus the combined output $P_{out}$ exhibits a smooth transition from the long-exposure range to the scaled short-exposure range.

This invention is not limited to the preferred embodiments described above, to which variations and improvements may be made, without departing from the scope of protection of the present patent.

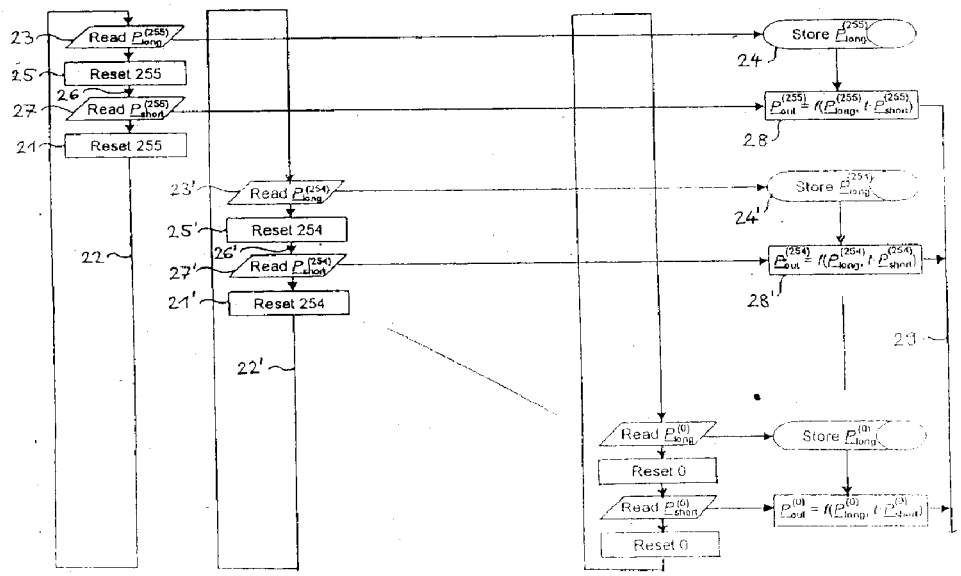

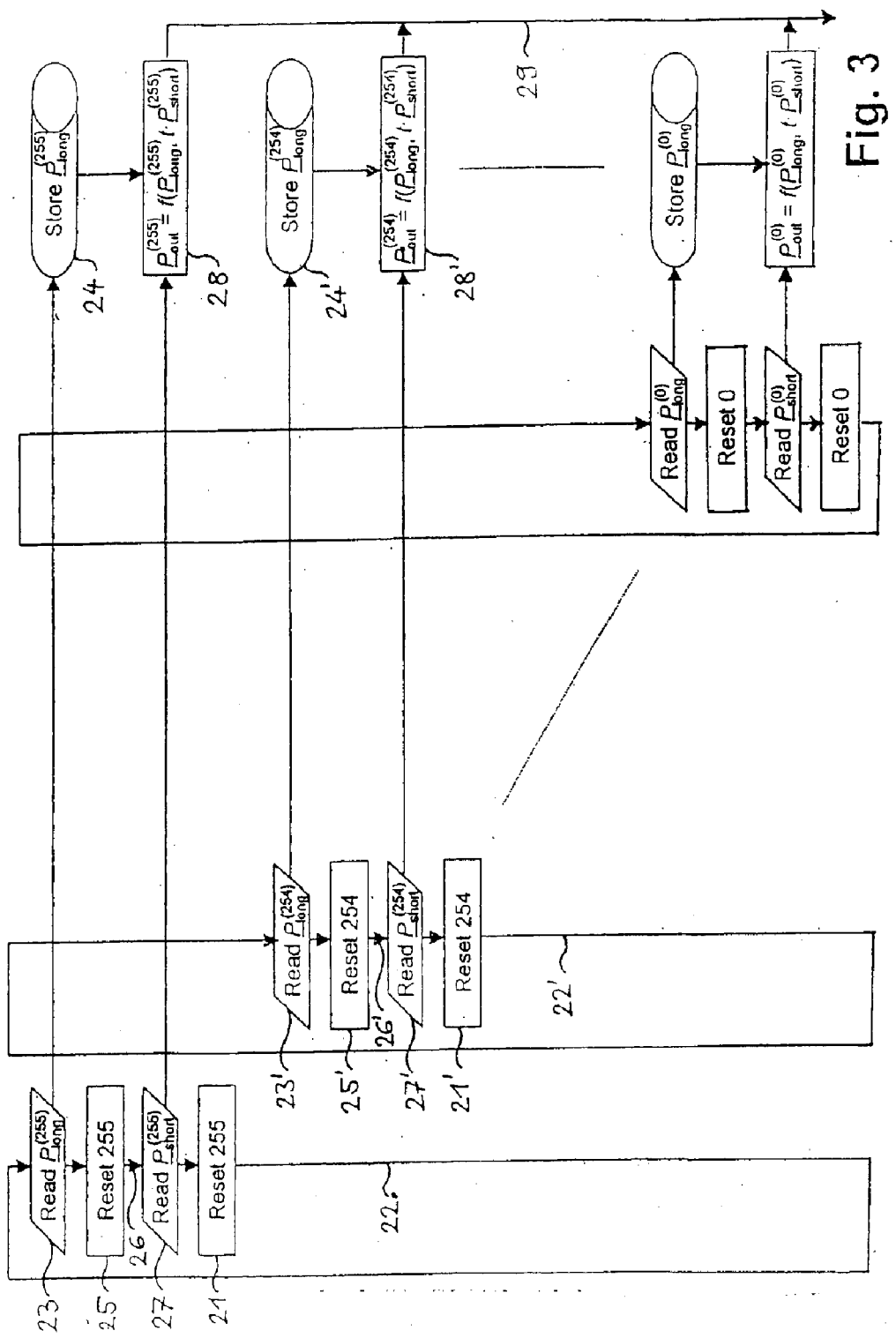

What is claimed is:

1. A method for forming an image by means of an image sensor with an active area containing a plurality of pixels, comprising the steps of:

(a) in two interrogation runs performed on a first subset of pixels, resetting the first subset of pixels, exposing the first subset of pixels and reading out the output value(s) of the first subset of pixels, wherein in said two interrogation runs, a longer exposure and a shorter exposure are performed;

(b) combining said output values into a first combined output value by means of a merging function which is truly monotonic, continuous and continuously differentiable in all said output values, wherein said merging function has the following properties:

(i) preference is given to the output value obtained from the longer exposure when said output values or a combination of said output values lie beneath a given lower limit;
(ii) preference is given to the output value obtained from the shorter exposure when said output values or a combination of said output values lie above a given upper limit;
(iii) said merging function increases truly monotonically in said output values when said output values lie between said lower limit and said upper limit; and
(c) repeating steps (a) and (b) for at least one second subset of pixels.

2. The method according to claim 1, wherein said subsets are rows, columns or single pixels of the image sensor.

3. The method according to claim 1, wherein prior to step (a), the active area of the image sensor is partitioned into subsets with equal numbers of pixels.

4. The method according to claim 1, wherein in step (a), at least one of said output value(s) is/are stored.

5. The method according to claim 1, wherein steps (a) and (b) are repeated until each pixel has been read out at least once.

6. The method according to claim 1, wherein performing steps (a) and/or (b) on one subset of pixels temporally overlaps with performing steps (a) and/or (b) on the following subset of pixels.

7. A method for forming an image by means of an image sensor with an active area containing a plurality of pixels, comprising:
(a) in n interrogation runs performed on a first subset of pixels, where n is an integer and $n \geq 2$, resetting the first subset of pixels, exposing the first subset of pixels and reading out the output value(s) of the first subset of pixels,
(b) combining said output values into a first combined output value;
(c) repeating steps (a) and (b) for at least one second subset of pixels;
wherein in step (b), said output values are combined into a combined output value by means of a merging function which is truly monotonic, continuous and continuously differentiable in all said output values, wherein n=2 for subsets of pixels, wherein in step (a), a longer exposure and a shorter exposure are performed wherein said merging function has the following properties:

(i) preference is given to the output value obtained from the longer exposure when said output values or a combination of said output values lie beneath a given lower limit;
(ii) preference is given to the output value obtained from the shorter exposure when said output values or a combination of said output values lie above a given upper limit;
(iii) said merging function increases truly monotonically in said output values when said output values lie between said lower limit and said upper limit.

8. The method according to claim 7, wherein said merging function is defined by $$f(x_1, x_2) = \sqrt{cx_1^2 + (1-c)x_2^2} \text{ with } c = (x_1 - x_{up})/(x_{low} - x_{up}) \text{ for } x_{low} < x_1 < x_{up}.$$

9. The method according to claim 1, wherein said image sensor is an active pixel sensor.

10. The method according to claim 1, wherein said output values are combined using a general-purpose digital computation unit, a dedicated digital or analog computation unit or a lookup table.

11. Image sensor for performing the method according to claim 1, comprising an active area containing a plurality of pixels whereby at least two subsets of pixels allow an individual interrogation; means for individually interrogating subsets of pixels; means for combining output values of said subsets into combined output values; and means for electrically outputting said combined output values.

12. Image sensor according to claim 11, said image sensor being an active pixel sensor (APS).

13. The method according to claim 1, wherein said merging function is defined by $$f(x_1, x_2) = \sqrt{cx_1^2 + (1-c)x_2^2} \text{ with } c = (x_1 - x_{up})/(x_{low} - x_{up}) \text{ for } x_{low} < x_1 < x_{up}.$$

* * * * *

UNITED STATES PATENT AND TRADEMARK OFFICE
CERTIFICATE OF CORRECTION

PATENT NO. : 6,927,793 B1
DATED : August 9, 2005
INVENTOR(S) : Seitz et al.

It is certified that error appears in the above-identified patent and that said Letters Patent is hereby corrected as shown below:

Delete Title page, and substitute, new Title page (attached).

Delete drawing sheet 3, and substitute, drawing sheet 3, with the attached sheet .

Signed and Sealed this

Twenty-fourth Day of January, 2006

JON W. DUDAS
*Director of the United States Patent and Trademark Office*

(12) United States Patent
Seitz et al.

(10) Patent No.: US 6,927,793 B1
(45) Date of Patent: Aug. 9, 2005

(54) METHOD AND DEVICE FOR FORMING AN IMAGE

(75) Inventors: Peter Seitz, Urdorf (CH); Graham K. Lang, Hausen AM Albis (CH); Nicolas Blanc, Oberrieden (CH)

(73) Assignee: CSEM Centre Suisse d'Electronique et de Microtechnique SA, Neuchatel (CH)

(*) Notice: Subject to any disclaimer, the term of this patent is extended or adjusted under 35 U.S.C. 154(b) by 0 days.

(21) Appl. No.: 09/439,915

(22) Filed: Nov. 12, 1999

(30) Foreign Application Priority Data

Nov. 18, 1998 (EP) .................................. 98121897

(51) Int. Cl.⁷ ............................................. H04N 5/235
(52) U.S. Cl. ................................. 348/230.1; 348/297
(58) Field of Search ........................... 348/229.1, 230.1, 348/222.1, 297

(56) References Cited

U.S. PATENT DOCUMENTS

| | | | |
|---|---|---|---|
| 4,647,975 A | * 3/1987 | Alston et al. | 348/222.1 |
| 4,734,776 A | 3/1988 | Wang et al. | |
| 5,144,442 A | * 9/1992 | Ginosar et al. | 348/222.1 |
| 5,309,243 A | 5/1994 | Tsai | |
| 5,572,256 A | * 11/1996 | Egawa et al. | 348/296 |
| 5,671,013 A | 9/1997 | Nakao | |
| 6,011,251 A | 1/2000 | Dierickx et al. | 348/297 |
| 6,115,065 A | * 9/2000 | Yadid-Pecht et al. | 348/308 |
| 6,175,383 B1 | * 1/2001 | Yadid-Pecht et al. | 348/297 |
| 6,204,881 B1 | * 3/2001 | Ikeda et al. | 348/362 |
| 6,429,898 B1 | * 8/2002 | Shoda et al. | 348/316 |
| 6,441,851 B1 | * 8/2002 | Yonemoto | 348/297 |
| 6,493,025 B1 | * 12/2002 | Kiriyama et al. | 348/231.99 |
| 6,677,992 B1 | * 1/2004 | Matsumoto et al. | 348/229.1 |

FOREIGN PATENT DOCUMENTS

EP  0 387 817 A2  9/1990

OTHER PUBLICATIONS

Aizawa K et al: "Computational Image Sensor for on Sensor Compression" IEEE Transactions on Electron Devices, vol. 44, No. 10, Oct. 1997, pp. 1724–1730, XP000703886.

* cited by examiner

Primary Examiner—Wendy R. Garber
Assistant Examiner—Jacqueline Wilson
(74) Attorney, Agent, or Firm—Oppedahl & Larson LLP

(57) ABSTRACT

The method for forming an image with a wide dynamic range makes use of an image sensor containing subsets of pixels that can be individually reset. After an initial reset (21), a pixel or row of pixels is exposed (22) for a first time interval and the gray value(s) ($P_{long}^{(255)}$) are read out (23) and stored (24). The pixel or row of pixels is then reset (25) and exposed (26) for a second, shorter time interval. The second gray value(s) ($P_{short}^{(255)}$) is/are read out (27) and either stored or immediately combined (28) with the first gray value(s) ($P_{long}^{(255)}$) by means of a merging function ($f$). The merging function ($f$) ensures a monotonic, smooth change in output from the lowest to the highest gray values. The procedure is repeated for all pixels or rows of pixels in the image sensor, thus obviating the need for the storage of complete images. The method reduces temporal aliasing to a minimum and eliminates spatial aliasing.

13 Claims, 3 Drawing Sheets